United States Patent [19]

Lorenz

[11] Patent Number: 4,573,853

[45] Date of Patent: Mar. 4, 1986

[54] GANTRIES FOR HAULING HEAVY LOADS OVER FIXED PATHS

[76] Inventor: Gary Lorenz, 5206 37th Ave. Court, Moline, Ill. 61265

[21] Appl. No.: 583,468

[22] Filed: Feb. 24, 1984

[51] Int. Cl.[4] .......................... B60P 3/00; B66C 5/04

[52] U.S. Cl. .................................. 414/460; 212/205; 212/208; 254/89 H

[58] Field of Search .............................. 414/460–461, 414/560–561; 212/205, 207–208; 254/89 H

[56] References Cited

U.S. PATENT DOCUMENTS

| | | | |
|---|---|---|---|
| 3,085,785 | 4/1963 | Peterson | 254/89 H |
| 3,302,801 | 2/1967 | Poroli | 212/208 |
| 4,236,859 | 12/1980 | Stearn et al. | 414/460 |
| 4,433,952 | 2/1984 | Glickman | 414/460 |
| 4,475,630 | 10/1984 | Jackson et al. | 254/89 H |

FOREIGN PATENT DOCUMENTS

| | | | |
|---|---|---|---|
| 204478 | 7/1959 | Austria | 414/460 |
| 1781276 | 12/1970 | Fed. Rep. of Germany | 414/460 |
| 2439667 | 3/1976 | Fed. Rep. of Germany | 212/208 |
| 2615215 | 10/1976 | Fed. Rep. of Germany | 212/207 |
| 680962 | 8/1979 | U.S.S.R. | 212/208 |
| 688419 | 10/1979 | U.S.S.R. | 212/208 |

*Primary Examiner*—Galen L. Barefoot
*Assistant Examiner*—R. B. Johnson
*Attorney, Agent, or Firm*—Laff, Whitesel, Conte & Saret

[57] ABSTRACT

A gantry has four separate base members adapted to move along spaced parallel tracks. In most configurations, adjustable tie rods connect the four base members into two associated pairs, each of the associated pairs being positioned to follow along one of the rails. A hydraulic ram or rams extends upward from each of the base members. A superstructure, usually in the form of four I- or H-beams in a somewhat rectangular frame configuration, is attached at the corners to the tops of the hydraulic rams for lifting a load within the space which is straddled by the gantry. Between the top of each of the rams and the beams forming the frame is a coupling which provides flexibility in a plane above the tracks. Part of the coupling is an arcuate section of a cylinder which enables the superstructure to rock by about 10°. The gantry may be reconfigured in many optional ways to enable it to change the attitude of the load.

10 Claims, 11 Drawing Figures

GANTRIES FOR HAULING HEAVY LOADS OVER FIXED PATHS

This invention relates to gantries and, more particularly, to gantries for hauling heavy loads over fixed paths.

A number of gantries have been used to provide lifting in the same load class which is lifted by the inventive gantry. Exemplary of such gantries is my earlier U.S. Pat. No. 4,381,839 and some of the prior art cited during the prosecution of that patent. In general, that patent relates to a two-point lift which required a coordination of three vertical hydraulic rams or cylinders located in a triangular pattern at each of the two points. The possible instability of lifting at two points and the need to coordinate three hydraulic rams present problems which led to a complex electrical control described in my earlier patent. Also, the two point suspension did not facilitate an easy change in attitude for many different forms of loads.

Accordingly, an object of the invention is to provide new and improved gantries, especially gantries for lifting, carrying, and rotating heavy loads over fixed paths. Here, an object is to provide more stable gantries. In particular, an object is to provide gantries having a four-point lift with a load which is centralized between the four points, or gantries which may provide lift at locations as needed depending on the load to be lifted.

Another object of the invention is to provide a device which enables the rotation of the heavy load that is being lifted. Here, an object is to provide a number of different rotating techniques whereby many different load configurations may be rotated by the selection and use of a technique appropriate to a specific configuration.

Another object of the invention is to provide gantries which have graduated lifting capabilities that relate to how high the load must be lifted.

Yet another object of the invention is to provide a large gantry which may be easily disassembled and carried about, and then assembled and installed on location.

In keeping with an aspect of the invention, these and other objects are accomplished by a gantry having a four-point base suspension. Each corner of the base includes a mobile base member which may be either self-propelled or pushed by a hydraulic arm. These base members are assembled in a more or less rectangular configuration. The four base members are adapted to travel along at least one pair of parallel rails. In some specialized cases, two pairs of rails may be used, one pair straddling the other pair. In the preferred embodiment, a single hydraulic ram extends perpendicularly upward from each of the base members, but the base member may be adapted to contain one or more hydraulic rams. Usually—but not always—four beams interconnect the tops of the rams in a generally rectangular superstructure. More particularly, a first pair of spaced parallel I-beams or H-beams are connected to the tops of the rams, and extend in a direction which is parallel to the rails. Above the top of each hydraulic ram, a rocker plate is connected to the I-beam or H-beam to enable approximately a 10° flexing in directions which are perpendicular to the rails. Above the rocker plates, a second pair of I- or H-beams extend perpendicularly between and are connected near opposite ends of the first pair of I-beams, thereby completing the superstructure having the general form of a rectangular I- or H-beam frame. The hydraulic rams may be retracted to lower the I- or H-beam frame. Next, a load may be hung by directly bolting such load to the I- or H-beam frame, or otherwise hung in any conventional manner from the I- or H-beams and preferably from the second pair of I- or H-beams. Then, the rams may be extended to lift the frame and, therefore, the load, after which the base members may be moved along the rails.

Each of the rams are double acting in that hydraulic pressure controls both the extension and retraction of the ram which includes a plurality of telescoping sections that are capable of lifting different weights, the lowermost sections lifting the heaviest load. The operator may operate the rams individually to coordinate and equalize the lifting capabilities and to maintain a level superstructure with the load in question. Or, sensors may be provided to enable all rams to lift in a self equalizing manner responsive to a single command signal. In the preferred embodiment, the rams may also be operated separately or in pairs to provide rotation of the load as it is being lifted thereby controlling the change in the attitude of loads resting on a surface. When this happens, the superstructure may be reconfigured to adapt it to fit the particular needs of a load configuration.

A preferred embodiment of the invention is shown in the attached drawing, wherein:

FIGS. 4A and 4B show the gantry being used to upend or turn a load from one side to another.

Figure 1:
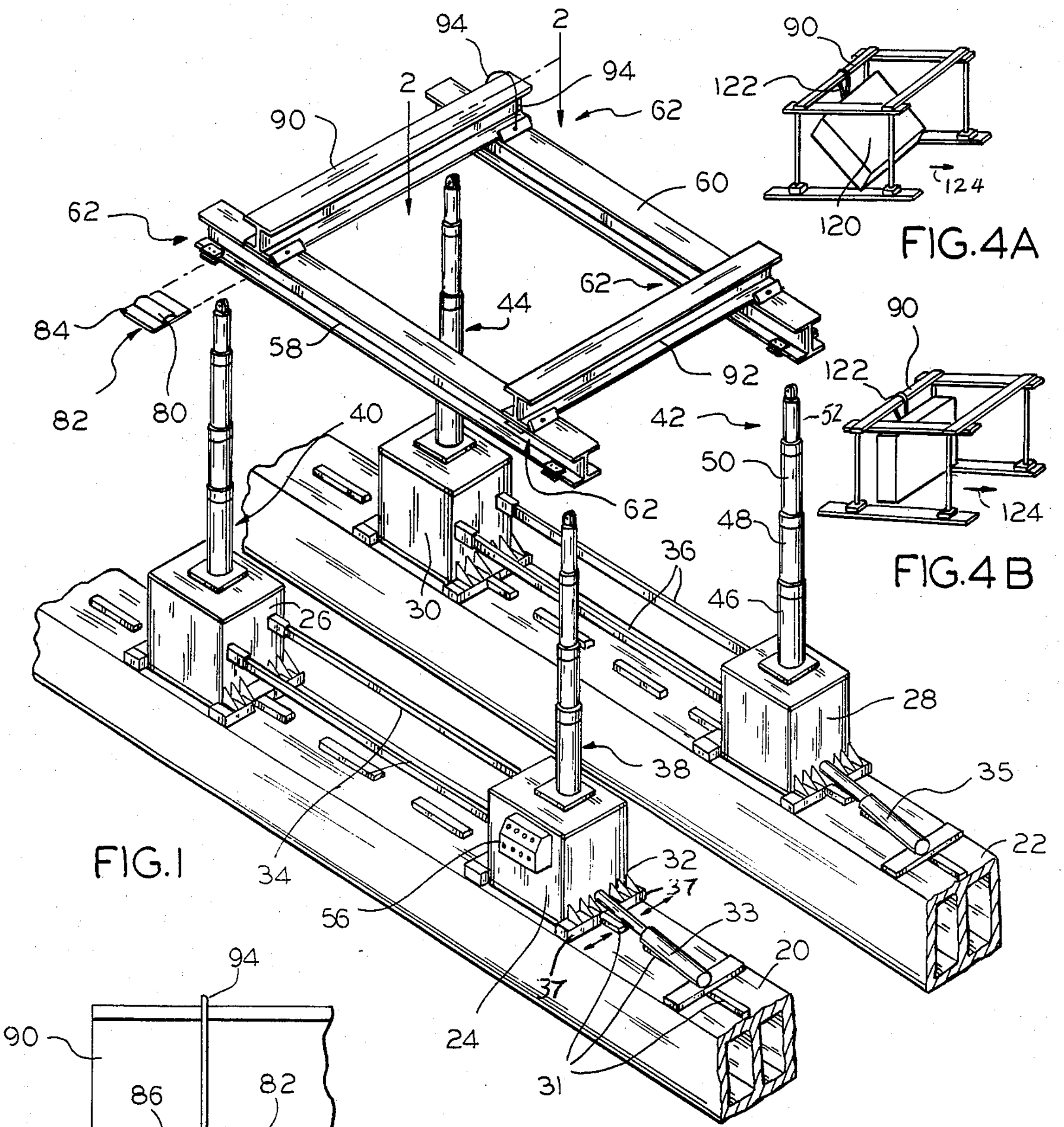
FIG. 1 is a partly exploded, perspective view of the inventive gantry.

The perspective view of FIG. 1 includes two pair of spaced parallel rails 20, 22 extending in a direction along which the inventive gantry moves. These rails are formed from metal plate, I- or H-beams or any other suitable shape or material, such as metal tubing, or the like. In most installations, at least a 10", 50# beam or the equal is used as the rails give a level platform to the gantry. The rails may be either part of a permanent installation; or, they may be hauled in and laid down at a particular site. A four-point suspension base includes four base members 24, 26, 28, 30 positioned at each of the four corners of a generally rectangular base pattern. As will be explained in connection with FIG. 5, the base pattern may depart from a true rectangle. However, it remains a somewhat rectangular pattern.

Each base member 24-30 may have wheels or treads (not shown) which run along the top surface of the rails 20, 22. The wheels or rails or both, may have flanges to guide and direct the path of the base members, or a center guide 31 may direct dual wheels on opposite sides of the base members.

A hydraulic ram 33, 35 may be coupled between the base units on either end of the gantry and a location marked by a center guide 31 which is removed along the rails from the base member. When the rams 33, 35 are extended against the center guide boss 31, the gantry is pushed along the rails (to the left, as viewed in FIG. 1). Then, the distal ends of the rams are retracted and repositioned against another center boss 31 and the rams are extended again. After the gantry is in position, the rams 33, 35 may be relocated in the opposite end (i.e. connected between base units 26, 30 and yet another center boss 31 on the rails 20, 22, to push the gentry back (to the right, as viewed in FIG. 1). Alternatively, each of the base units 24–30 may be self-propelled, as by a hydraulic motor or rotary drive mechanism.

Gussets 32 are welded to the supporting structure for each of the base members in order to give added mechanical strength. The wheel housings (shown as rectangular boxes 37) may be moved between in board and out board positions for stability or to provide a reduced width of gantry or foot print for greater clearance in a crowded area. The spacing between the tracks may also be increased or reduced to equal the desired gantry width.

Telescoping tie rods 34, 36 interconnect the two associated pairs of base members 24, 26 and 28, 30, in a relationship so that each of the associated pairs travels down one of the respective rails 20, 22. Thus, if the load is short, the tie rods 34, 36 may be made shorter. If the load is long, these tie rods may be made longer. At the time of installation, the tie rods are bolted into position to fix their lengths and provide stability for travel.

Extending perpendicularly upward from each of the base members 24–30 is a hydraulic ram 38–44. In the preferred embodiment, each base contains a single ram, but the base may be modified to contain one or more additional rams. Each ram has a plurality of telescoping sections, such as those numbered 46–52. Preferably, each bottom section (such as 46) is fixed on the top of the base member 28, and may be in the order of ten feet long, in one example. Each of the other sections 48, 50, 52 may then be in the order of seventy inches long, in this particular example. The first or lower stage 48 may be adapted to support one-hundred tons. In that case, the middle section 50 may be adapted to support seventy tons, and the upper section 52 to support fifty tons. Thus, heavier loads may be lifted if they are to be lifted no higher than a height reached by an extension of section 48, alone. If the loads are lifted to the full height of the gantry, they must be no heavier than the lifting capability of the last section 52 (i.e. fifty tons in this example). When a plurality of rams are used in each base, capacities are increased by the number of rams.

A suitable control panel 56 may be provided at any convenient location, so that each of the rams may be individually controlled, as it is extended or retracted. Or, once the load is true and the superstructure is leveled, all four of the rams may be raised or lowered in unison, by a manipulation of a single control. A superstructure means includes two beams 58, 60 which extend in a spaced parallel relationship between the four rams. In theory, these beams 58, 60 may extend in either of two perpendicular directions; however, in the preferred embodiment, the beams extend parallel to the rails 20, 22. In general, most loads are such that the operator can visually see the lifting ends of the rams 38–44 and tell whether the rectangular frame forming the I-beam superstructure is level and the load is handing straight. Hence, the operator can true the load by lifting (or lowering) a ram at a single corner of the I- or H-beam frame. Suitable sensors may also be provided to detect whether the load is hanging straight or to, in effect, weigh the load carried by each ram. These sensors may control and vary the rate of lift at each corner so that the I- or H-beam frame remains level. Optional measuring devices tell the length of each ram extension to determine if the rams are equally extended and if the superstructure is level.

Figure 2:
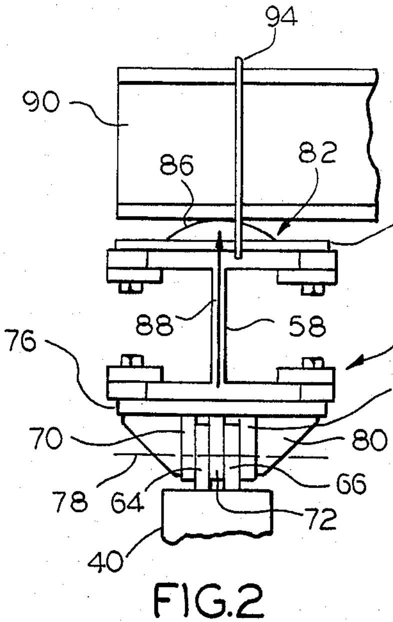
FIG. 2 is a cross sectional view of a rocker plate and safety cable taken along line 2—2 of FIG. 1.

The couplings which joins each corner of the superstructure frame members is shown at 62, by way of example, and in FIG. 2. In greater detail, the top of each ram has fixed thereto a plurality of upstanding, vertical, spaced parallel plates 64, 66 forming a shackle or clevis. A mating fastener includes similar spaced parallel vertical plates 70, 72, 74 which are welded to horizontal header plate 76 and which interleave with plates 64, 66. A hinge pin (represented by line 78) passes through aligned holes in plates 64, 66, 70, 72, 74 to enable a freedom for the superstructure members 58, 56 to pivot around the axis of the pins. A horizontal header plate 76 is bolted to the bottom of the I- or H-beams 58 or 60 at each corner 62 of the superstructure frame. Any suitable number of gussets 80 may be welded between header plate 76 and vertical plates 70, 74 to increase the strength of the corner coupling 62.

On top of the I- or H-beams 58, 60, at each corner 62, is a rocker plate 82 assembly. The rocker plate assembly 82 includes a horizontal header plate 84 and a dome in the form of an arcuate section of a cylinder 86. The header plate 84 is bolted to the top of I- or H-beams 58 or 60, as best seen in FIG. 2. At each corner, a safety cable 94 wraps around beam 90 and is welded or otherwise attached to header plate 84 to prevent the I- or H-beams 90, 92 from sliding off the rocker panel assembly 82. The cylindrical dome 86 has an axis which extends perpendicularly (in the horizontal plane) to the axis 78 of the hinge pin, thereby giving a freedom of movement in a second of the two axis of the horizontal plane of the superstructure. The upper surface of the cylinder 86 has a cross section with an arc of a circle having a radius 88, centered on the bottom of the lower I- or H-beams 58, 60. The curvature of the arc at 86 is such that beams 90, 92 may rock or flex by approximately 10° relative to the I- or H-beams 58, 60 which supports the rocker plate 82, and which tie the structure together.

Figures 3A, 3B, 3C:
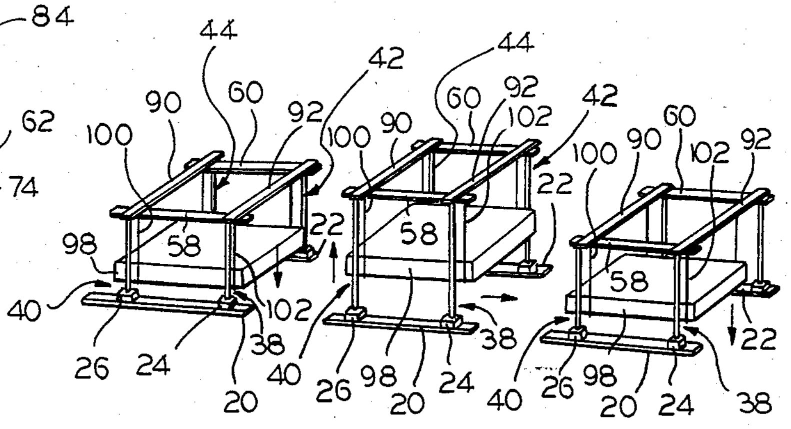
FIGS. 3A-3C show three stop motion views which help explain the usual and most conventional operation of the gantry.

The most often used operation of the gantry is shown in the three stop motion views of FIG. 3. In FIG. 3A, a load 98 was laying on the ground or floor and between rails 20, 22. The gantry moved over the load and the rams 38, 40, 44, 46 were retracted to lower the superstructure (beams 58, 60, 90, 92). One end of cable 100 is secured around beam 90. The cable is passed under or otherwise attached to the load, and the other end is returned to and also secured around beam 90. Likewise, opposite ends of cable 102 are secured around beam 92 and the center of the cable is passed under or otherwise attached to the load 98. The cables 100, 102 do not have to be too tight while the superstructure is in a lowered position; however, as shown in FIG. 3A, the cables 100, 102 are tensioned as soon as the load 98 is lifted. They should carry it in a horizontal position.

In FIG. 3B, the rams 38, 40, 42, 44 are extended to lift the superstructure comprising beams 58, 60, 90, 92 and thereby lift the load 98 off the ground or floor far enough to carry it comfortably. The gantry is then pushed by rams 33, 35 (FIG. 1) or runs under its own power down the rails 20, 22 to any desired location.

In FIG. 3C, the gantry is stopped and the rams are retracted to lower the superstructure formed by beams 58, 60, 90, 92. After the load 98 again rests on the ground or floor, and the cables 100, 102 reach a slack position, and are removed. Then, the gantry moves away.

FIGS. 4A and 4B are two stop motion views showing the inventive gantry being used to upend, or rotate a load. In greater detail, one end of a load 120 is secured at 122 to the beam 90. As the gantry is raised, that one end raises. The gantry moves forward slightly, as shown by arrow 124, to position the end of the load under the support at 122. Thus, the load has been upended.

by a similar technique, the load may be rolled, turned, or othewise repositioned. Also, one end of the load may be tied to anyone of the superstructure beams (such as 90), the load may be lifted a short distance to change its attitude (as shown in FIG. 4A). Then, the other end might be tied to another beam, such as 60 and the load may be lifted another short distance. Thereafter, the load could be tied to beam 92 and lifted still further. In this manner, the attitude of the load may be changed in almost any manner, within reason.

FIGS. 5A–5D show yet another technique for rotating a load. Here, (FIG. 5A) a second set of rails 20*a,* 22*a* are laid down in a spaced parallel relationship, straddling the first pair of rails 20, 22. The base members or support units 24, 28 are moved to the second or outside rails so that they may be moved past the first supports 26, 30 which remain on the central or straddled pair of rails. While, the base pattern is no longer exactly rectangular, it remains somewhat rectangular. The superstructure beams 58, 60 (FIG. 1) and the tie rods 34, 36 are not used. The rams 38, 46 (FIG. 5A) may be raised far enough over the rams 40, 44 so that the beam 92 may pass over the beam 90. Therefore, the base members or support units 24, 28 may be moved back and past the supports 26, 30.

Figure 5A:
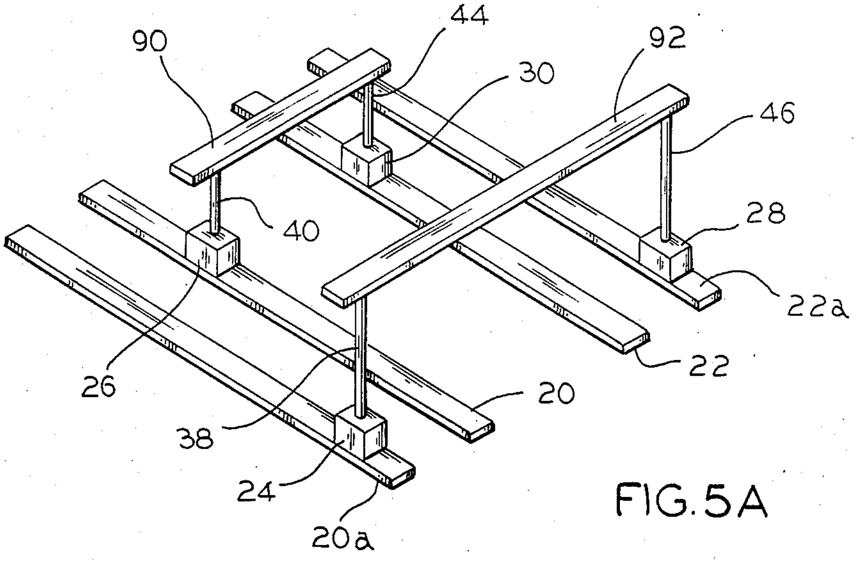
FIGS. 5A-5D illustrate one reconfiguration of the gantry by way of an explanation of how it may be adapted to serve special needs.
Figure 5B:
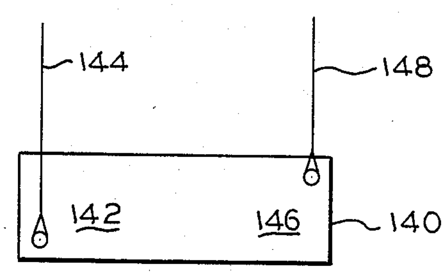
Figure 5C:
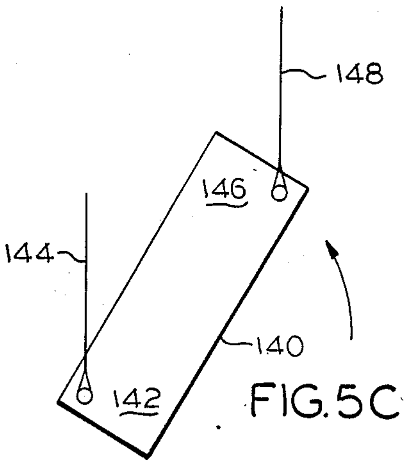
Figure 5D:
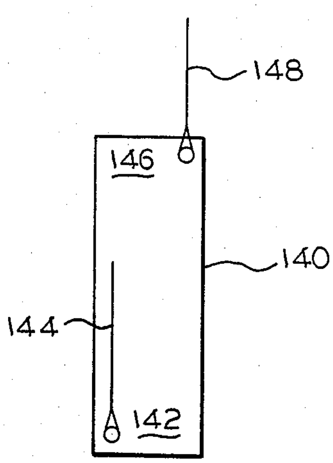

FIGS. 5B–5D show the sequence of lifting and rotating a load 140 by this technique. The gantry is moved over the load 140 where its end 142 is tied to beam 90 by means of cable 144 and end 146 is tied to beam 92 by means of cable 148.

As shown in FIG. 5C, the cable 148 is lifted more than the cable 144 as the rams 38, 46 are raised to a level which is higher than the level to which the rams 40, 4r4 are raised. Also, the base members or support units 24, 28 are pushed toward the supports 26, 30 to compensate for the movement in the horizontal plane of load end 146 toward load end 142.

When the load 140 reaches its vertical position (FIG. 5D), the cables 144, 146 have not approached each other closely enough to cause a collision at some point on the gantry. Thus, the load may be set down. If need be, new connections may be established between the load and the overhead gantry beams to continue the rotation.

Obviously, these techniques may be expanded, depending upon the shape and size of the load, the opportunity to attach a cable or other means to the load, and the like.

Hence, there is a use of a four points of suspension in different planes in order to rotate the load in any desired manner. Moreover, the beams 58, 60 and 90, 92 may be relocated relative to each other. Thus, there is a great flexibility in the operation of the system.

The cylinders of the rams 38, 40, 42, 44 may be made double acting so that the lifting speed may be controlled differently for raising or lowering the load.

In some cases, it may be desirable to duplicate the base member or support units 24, 26, 28, 30 and their associated rams. Thus, the gantry could have, say six or eight lifting rams.

The advantages of the invention should now be clear. Rails 20, 22 may be permanently installed, as in a factory or warehouse. Or, a truck may bring the rails into a temporary location, such as a building site, where the rails are lifted into position by a crane, or the like. Each of the base members 24, 26, 28, 30 may be brought in as a separate unit and placed upon the rails 20, 22 and the system configured to meet the needs of the load to be lifted. The lengths of the tie rods 34, 36 are adjusted to correspond to the needs of the system and then are bolted together to secure their length, before the tie rods are attached to form the base members 24, 26 into associated pairs of one or more of such base members or whatever configuration is required. The superstructure I- or H-beams 58, 60, 90, 92 may have any suitable length or spacing which is selected for the particular loads which are to be carried. These beams are secured in place and the gantry is ready to operate.

When it is no longer needed, the gantry may easily be disassembled and hauled away to a new location.

Those who are skilled in the art will readily perceive how to modify the invention. Therefore, the appended claims are to be construed to cover all equivalent structures which fall within the true scope and spirit of the invention.

The claimed invention is:

1. A gantry comprising at least four base members positioned at the corners of a generally rectangular pattern and adapted to move along at least two spaced parallel paths, tie rod means for assembling said four base members into two associated pairs, each of said pairs being positioned to follow an individually associated one of said paths, lifting means comprising at least one hydraulic ram extending perpendicularly upward from each of said base members, superstructure means generally forming a rectangular frame attached at its corners to the tops of said hydraulic rams for lifting a load within the space between said parallel paths which is straddled by said gantry, and coupling means in said superstructure for providing flexibility at each of the corners of said rectangular frame, said flexibility being along two perpendicular axes in a plane parallel to said two paths said superstructure comprises a first pair of spaced parallel beams pivotally coupled to the tops of said hydraulic rams with freedom to pivot up or down in a direction which is parallel to said paths, a second pair of spaced parallel beams resting on and extending between said first pair of beams thereby forming a generally rectangular frame, and rocker plate means comprising an arcuate segment of a cylinder positioned between the first and second of said beams at each point where a second beam rests on a first beam, the contours of said cylindrical segment enabling said superstructure to have approximately 10° freedom to rock side to side in directions which are perpendicular to said paths.

2. The gantry of claim 1 wherein said coupling means comprises at least one upstanding vertical plate extending above the top of said ram and at least one dependent vertical plate extending below said superstructure, the sides of said two vertical plates being in a confronting relationship, a pivot pin passing through said two confronting plates, and a rocker plate means comprising an elongated cylinder segment positioned to enable said superstructure to rock in directions perpendicular to said pivot pin.

3. The gantry of claim 2 wherein there are an interleaved plurality of said confronting vertical plates, interconnected by said pivot pin.

4. The gantry of claim 1 wherein said coupling means comprises at least one upstanding vertical plate extending above the top of said ram and at least one dependent vertical plate extnding below said superstructure, the side of said two vertical plates being in a confronting relationship, a pivot pin passing through said two confronting plates.

5. The gantry of claim 1 and means for individually controlling each of said rams whereby separate ones of said rams may be individually raised or lowered to maintain a generally level superstructure.

6. The gantry of claim 1 wherein each of said base members is self-propelled.

7. The gantry of claim 1 and hydraulic ram means connected between at least one of said base members and a fixed point along at least one of said paths for moving said gantry along said path.

8. The gantry of claim 1 wherein each of said four base members has at least four wheel means for supporting it and means for moving said wheel means between inboard and outboard positions to provide greater stability or reduce the width of said base member whereby greater clearance may be provided in crowded area.

9. The gantry of claim 1 and an arcuate segment of a cylinder positioned between said beams in the corner areas of said rectangular frame, the contours of said cylinder enabling said beams to rock relative to each other by said approximately 10°.

10. The gantry of claim 9 and means for propelling said gantry along a path defined by a pair of rails extending along and parallel to said one side of said rectangular pattern, each of said base units riding along at least an associated one of said rails as said gantry is propelled.

* * * * *